United States Patent [19]

Operschall

[11] Patent Number: 4,950,086

[45] Date of Patent: Aug. 21, 1990

[54] STRUCTURE HAVING RADIOACTIVE PLANT COMPONENTS

[75] Inventor: Hermann Operschall, Lauf, Fed. Rep. of Germany

[73] Assignee: Siemens Aktiengesellschaft, Berlin and Munich, Fed. Rep. of Germany

[21] Appl. No.: 398,296

[22] Filed: Aug. 24, 1989

Related U.S. Application Data

[63] Continuation of Ser. No. 106,566, Oct. 8, 1987, abandoned.

[30] Foreign Application Priority Data

Oct. 13, 1986 [DE] Fed. Rep. of Germany ....... 3634881

[51] Int. Cl.$^5$ ............................................. G21C 11/02
[52] U.S. Cl. .................................................... 376/293
[58] Field of Search ............... 376/260, 272, 273, 289, 376/292-296

[56] References Cited

U.S. PATENT DOCUMENTS

| | | | |
|---|---|---|---|
| 3,158,546 | 11/1964 | Cordova | 376/273 |
| 3,186,913 | 6/1965 | Weisner et al. | 376/295 |
| 3,258,403 | 6/1966 | Malay | 376/295 |
| 3,320,969 | 5/1967 | Gordon | 376/295 |
| 3,379,615 | 4/1968 | Halliday | 376/293 |
| 3,537,420 | 11/1970 | Chollet et al. | 376/293 |
| 3,794,559 | 2/1974 | Davies et al. | 376/294 |
| 3,816,246 | 6/1974 | Kumpf | 376/295 |
| 3,893,508 | 7/1975 | Nemet | 376/294 |
| 3,899,393 | 8/1975 | Dorner et al. | 376/293 |
| 4,050,983 | 9/1977 | Kleimola | 376/293 |
| 4,279,701 | 7/1981 | Ebata et al. | 376/293 |
| 4,472,349 | 9/1984 | Hista | 376/293 |
| 4,483,790 | 11/1984 | Gaiser | 376/273 |
| 4,643,870 | 2/1987 | Hunsbedt et al. | 376/293 |
| 4,752,436 | 6/1988 | Snyder | 376/293 |
| 4,818,472 | 4/1989 | Operschall et al. | 376/260 |

FOREIGN PATENT DOCUMENTS

| | | | |
|---|---|---|---|
| 3321255 | 12/1984 | Fed. Rep. of Germany | 37.6/295 |
| 0007391 | 1/1985 | Japan | 376/293 |
| 2002191 | 1/1987 | Japan | 376/293 |
| 1429685 | 3/1976 | United Kingdom | 376/295 |
| 2157880 | 10/1985 | United Kingdom | 376/295 |

OTHER PUBLICATIONS

"Nuclear Safety" vol. 20, No. 1, Jan-Feb. 1979 Article: Nuclear Power-Reactor Decommissioning.
"Electrical World" Feb. 15, 1978 Article: Decommissioning Commerical Reactors.

*Primary Examiner*—Daniel D. Wasil
*Attorney, Agent, or Firm*—Herbert L. Lerner; Laurence A. Greenberg

[57] ABSTRACT

An assembly includes a structure. A shielding apparatus is disposed inside the structure and radioactive plant components having sides and a bottom are surrounded by the shielding apparatus. The radioactive plant components include relatively highly radioactive components and relatively weakly radioactive or non-radioactive components. A water-tight vessel embedded in the structure has an interior and an outside and exclusively surrounds the radioactive plant components at the sides and at the bottom with the relatively highly radioactive components disposed in the interior and the relatively weakly radioactive or non-radioactive components disposed at the outside. The water-tight vessel is sufficiently large to hold water serving as a shielding device and to hold crushed contaminate pieces of the radioactive plant components during subsequent dismantling of the plant components.

6 Claims, 1 Drawing Sheet

U.S. Patent
Aug. 21, 1990
4,950,086
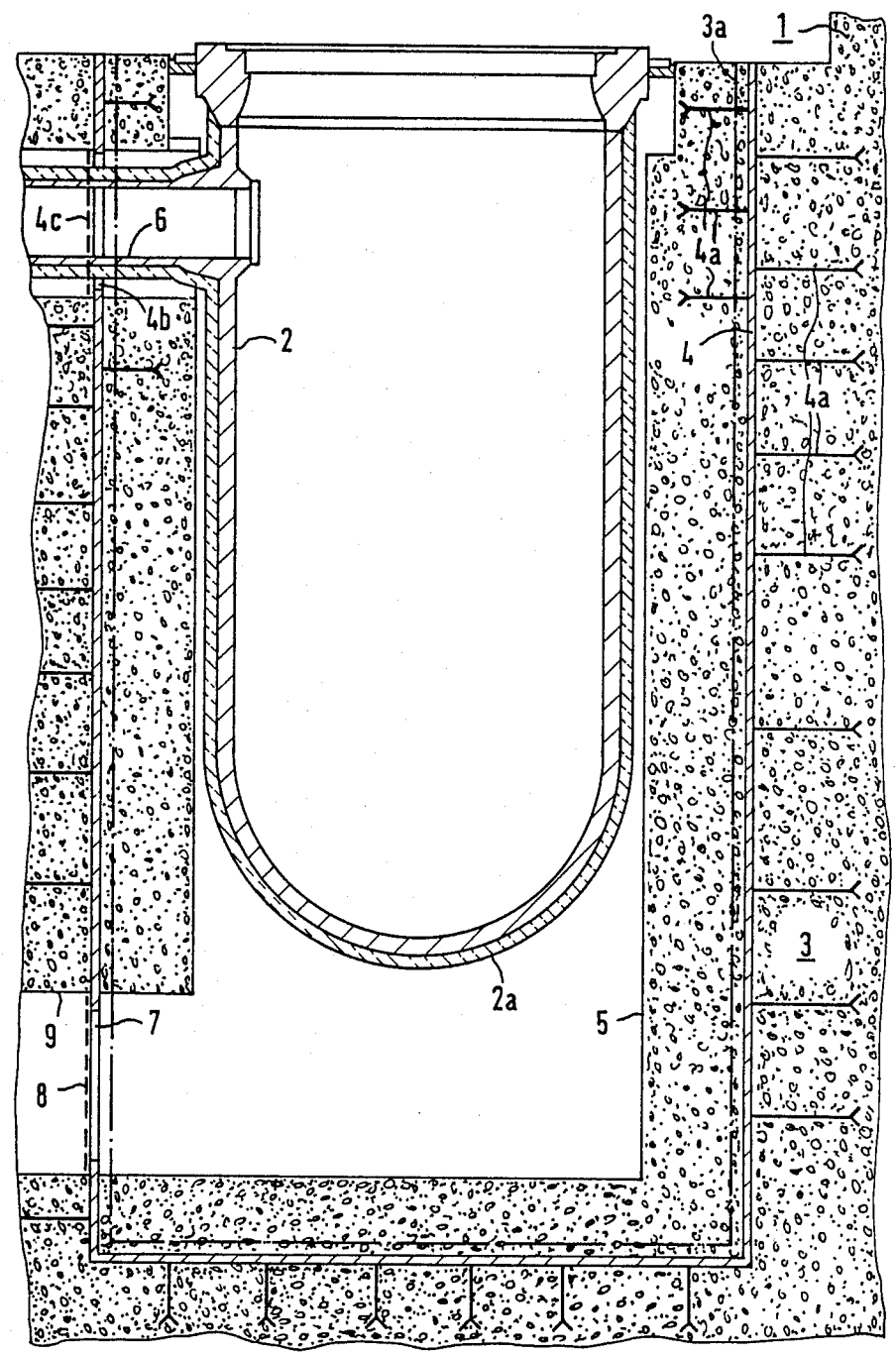

STRUCTURE HAVING RADIOACTIVE PLANT COMPONENTS

This application is a continuation of application Ser. No. 106,566, filed Oct. 8, 1987, now abandoned.

The invention relates to a structure having radioactive plant components, including shielding devices surrounding the components inside the structure and a vessel in the structure only surrounding the radioactive plant components at the side and at the bottom.

When dismantling and crushing radioactive plant components, the radiation load affecting the operating personnel can be kept at a low level by providing short personnel exposure times, good shielding against radiation and the use of remote control machines and equipment. Due to poor accessibility, shielding devices using thick shielding plates cause problems in the event of the malfunction of disassembly equipment and during the removal of the radioactive components. Since good viewing conditions are also lacking, the manipulation of the disassembly tools is also made more difficult.

Good natural shielding can also be produced using water. However, since fissures in the concrete of the biological shield may develop after years of operation, it is possible that the contamination may spread into the structure when water is used for shielding, resulting in greatly increased amounts of radioactive waste.

It is known from the journal Electrical World, Feb. 15, 1978, page 47/48, to dismantle a demonstration reactor by filling both the safety vessel that surrounds the reactor vessel having the cooling system and the pool or pit for spent and new fuel elements with water for shielding against radioactive radiation, and by crushing the reactor vessel into small fragments. The fragments are first moved to a storage pool or pit by a crane and are then delivered to a final storage location. This conventional method produces great quantities of radioactive waste and the final storage thereof entails high costs.

FIG. 1 of U.S. Pat. No. 3,158,546 discloses a nuclear power plant having a reactor pressure vessel disposed in a concrete pit, which is lined on the inside with a special vessel to approximately ⅔ the height of the reactor pressure vessel. This vessel extends only up to a predetermined height of the concrete pit, not up to the height of the reactor pressure vessel, so that the reactor pressure vessel cannot be placed completely under water from the outside.

It is accordingly an object of the invention to provide a structure having radioactive plant components, which overcome the hereinafore-mentioned disadvantages of the heretofore-known devices of this general type and which minimizes as much as possible the radioactive waste produced when radioactive plant components which are activated by neutron bombardment and/or are contaminated are dismantled or crushed, while exposing the personnel to as little radiation as possible and assuring both good viewing conditions and good accessibility.

With the foregoing and the other objects in view there is provided, in accordance with the invention, an assembly, comprising a structure, a shielding apparatus inside the structure, radioactive nuclear plant components being surrounded by the shielding apparatus and having sides and a bottom, the radioactive plant components including relatively highly activated components and relatively weakly activated or inactive components, and a water/tight vessel in the structure having an interior and an outside and exclusively surrounding the radioactive plant components at the sides and at the bottom with the relatively highly activated components disposed in the interior and the relatively weakly activated or inactive components disposed at the outside, the water-tight vessel being sufficiently large to hold water serving as shielding means and to hold crushed contaminated pieces of the radioactive plant components during subsequent dismantling of the plant components.

During dismantling with the assembly according to the invention, the products that arise in the separation process cannot contaminate the components located outside the enclosure, which keeps the quantity of radioactive waste to a minimum.

As a result, final disposal is less complicated and less costly than when the conventional method is used. When the structure is first built, the water-tight vessel can already be fitted into the shielding apparatus having the components which are activated by neutron bombardment during the course of operation and are contaminated by the spread of fission and corrosion products.

The secondary waste arising during the separation can be intercepted in the water-tight vessel. The vessel itself can also serve as a receptacle both for coolant and lubricant for the separating devices and for the separating devices themselves. Furthermore, the vessel can be used as an interlayer for cut-up pieces and as a trans-shipping or reloading site. In accordance with another feature of the invention, there are provided filler bodies, the radioactive plant components including a reactor pressure vessel with fittings, the shielding apparatus being in the form of a biological shield having a reactor cavity formed therein, part of the biological shield being disposed inside the water-tight vessel, the water-tight vessel being disposed exclusively in the reactor cavity, and the water-tight vessel being large enough to also hold dismantled or disintegrated pieces of the reactor pressure vessel fixtures, the filler bodies, and the part of the biological shield.

In accordance with a further feature of the invention, the reactor pressure vessel includes a heat shield, and the water-tight vessel is large enough to also hold dismantled pieces of the heat shield.

Since the biological shield in a reactor can be more highly activated or contaminated, at least in a portion thereof adjoining the reactor pressure vessel, it is advantageous for the water-tight vessel to be built into the biological shield and additionally for it to be dimensioned for holding the disintegrated pieces of the fixtures or internals of the reactor pressure vessel, the filler bodies, especially the heat shield and the biological shield disposed inside the vessel.

In accordance with an added feature of the invention, there are provided anchors disposed on the water-tight vessel for retaining the water-tight vessel in the biological shield.

In accordance with an additional feature of the invention, the water-tight vessel has openings formed therein, and means for water-tightly closing the openings when the reactor pressure vessel is dismantled. In acccordance with a concomitant feature of the invention, there are provided coolant lines disposed in the openings. These features are provided so that vessel can be flooded with water up to a particular level required for the shielding. As a result, the highly radioactive components, such as the reactor pressure vessel, the liner, and the liner part of the biological shield, can be disassembled using water as shielding means. This kind of shielding enables easy accessibility, good illumination conditions and good handling of the cut-up pieces. It is advantageous for the water-tight vessel to be equipped for holding a water cleaning system. In this way, good viewing conditions are attained during the disassembly.

After the enclosure itself has been removed, the outer parts of the biological shield can be dismantled in a dry fashion with low radiation exposure to personnel.

Other features which are considered as characteristic for the invention are set forth in the appended claims.

Although the invention is illustrated and described herein as embodied in a structure having radioactive plant components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the drawing.

The figure of the drawing is a fragmentary, diagrammatic, cross-sectional view of the structure according to the invention.

Referring now to the single figure of the drawing in detail, it is seen that element 1 is part of a structure which is shown in section, in which radioactive components of a plant, such as a reactor pressure vessel 2 or the like, are accommodated. These components of the plant are surrounded by a shielding apparatus. The shielding apparatus for the reactor pressure vessel 2 is in the form of a concrete biological shield 3.

A water-tight vessel 4 that only surrounds the radioactive component of the plant laterally and at the bottom is provided in the structure. The vessel 4 is dimensioned for holding water used for shielding and the crushed contaminated pieces of the radioactive plant component, during the subsequent dismantling of the component of the plant. Since the radioactive plant component is a reactor pressure vessel 2 in the illustrated embodiment, it is advantageous for the water-tight vessel 4 to be built only in the part of the biological shield 3 that forms a reactor cavity or pit 5. The water-tight vessel is therefore dimensioned not only for the crushed contaminated pieces of the reactor pressure vessel but also for holding disintegrated pieces of fixtures or internals of the reactor pressure vessel, filler bodies, especially a heat shield 2a, and the part of the biological shield that is disposed inside the vessel 4. Filler bodies are disposed in the reactor vessels of heavy-water reactors in order to save water.

Anchors 4a are disposed in the concrete of the biological shield 3 on the outside of the water-tight vessel 4, for retention purposes.

The vessel 4 has required openings 4b and 7 for fittings or internals in the form of coolant supply lines 6 and coolant outlet lines and for a manhole 9. The openings 4b and 7 are later closed during dismantling of the reactor pressure vessel by respective covers 4c and 8. As a result, a water-tight enclosure is provided, which is flooded with water when the reactor pressure vessel is dismantled.

The water-tight vessel 4 is constructed and disposed in such a manner that more highly activated parts of the shield 3 are located on the inside of the line 3a and weakly activated or inactive components are located on the outside of the line 3a. As a result, the highly radioactive components such as the reactor pressure vessel, liner and the inner part of the biological shield can be dismantled using water as shielding means.

I claim:

1. Assembly, comprising a structure, a shielding apparatus inside said structure, a radioactive plant component having a given height and being surrounded by said shielding apparatus prior to dismantling said radioactive plant component, said radioactive plant component and said shielding apparatus having sides and a bottom, said shielding apparatus including relatively highly radioactive parts and relatively weakly radioactive or non-radioactive parts, and a water-tight vessel having sides and a bottom embedded in said structure, having an interior and an outside and surrounding said radioactive plant component and said relatively highly radioactive parts exclusively at the sides and at the bottom with said relatively highly radioactive parts disposed in the interior and said relatively weakly radioactive or non-radioactive parts disposed at the outside, said water-tight vessel having substantially said given height and being sufficiently large to hold water serving as shielding means and to hold crushed contaminated pieces of all of said radioactive plant component and said relatively highly radioactive parts during subsequent dismantling of said plant component and said relatively highly radioactive parts.

2. Assembly according to claim 1, wherein said radioactive plant component includes a reactor pressure vessel with fittings, said shielding apparatus being in the form of a biological shield having a reactor cavity formed in a portion thereof, part of said biological shield being disposed inside said water-tight vessel, said water-tight vessel being disposed exclusively in said portion of said biological shield in which said reactor cavity is formed, and said water-tight vessel being large enough to also hold dismantled pieces of said reactor pressure vessel fittings, and said part of said biological shield disposed inside said water-tight vessel.

3. Assembly according to claim 2, wherein said reactor pressure vessel includes a heat shield, and said water-tight vessel is large enough to also hold dismantled pieces of said heat shield.

4. Assembly according to claim 2, including anchors disposed on said water-tight vessel for retaining said water-tight vessel in said biological shield.

5. Assembly according to claim 2, wherein said water-tight vessel has openings formed therein, and means for water-tightly closing said openings when said reactor pressure vessel is dismantled.

6. Assembly according to claim 5, including coolant lines disposed in said openings.

* * * * *